Patented Sept. 23, 1947

2,427,775

UNITED STATES PATENT OFFICE 2,427,775

ISOMERIZATION OF SATURATED HYDROCARBONS

Bernard S. Friedman, Riverside, Ill., assignor to Universal Oil Products Company, Chicago, Ill., a corporation of Delaware No Drawing. Application October 23, 1943, Serial No. 507,485

16 Claims. (Cl. 260—683.5)

This invention relates to the catalytic isomerization of isomerizable saturated hydrocarbons and is more specifically concerned with an improved process wherein these hydrocarbons are isomerized under carefully selected conditions of operation in the presence of certain substituted aromatic hydrocarbons.

The isomerization of saturated hydrocarbons has assumed considerable importance at the present time, particularly the isomerization of normally liquid paraffinic hydrocarbons such as pentane, hexanes, heptanes, etc., which upon isomeriztation produce compounds which have very desirable antiknock properties when included in aviation gasoline blends and other motor fuels. Moreover, these isomerized products, especially the isomers having at least one tertiary carbon atom per molecule, may be alkylated with an alkylating agent such as an olefin, alcohol, etc., to produce higher molecular weight alkyl derivatives which have very desirable antiknock qualities and which are useful intermediates in organic synthesis.

It is well known that saturated hydrocarbons may be isomerized using catalysts of the Friedel-Crafts type such as aluminum halides, zinc halides, zirconium halides, or mixtures thereof in the presence of a hydrogen halide. The primary operating difficulty accompanying these isomerization operations is the tendency toward high catalyst consumption due to the formation of metal halide-hydrocarbon complexes. The catalyst complexes or sludges are formed by the interaction of the metal halide with the products of decomposition reactions which occur simultaneously with the isomerization reaction.

Various methods have been proposed to prevent the decomposition of the saturated hydrocarbons thereby preventing high catalyst consumptions. For example, it has been proposed to introduce hydrogen into the reaction zone to suppress decomposition and presumably to hydrogenate unsaturated hydrocarbon fragments formed by decomposition of the charging stock. The use of hydrogen as a decomposition suppressor has been found to be very expensive and entails the use of a considerable amount of auxiliary equipment such as compressors, separators, etc., to provide a means for recycling the hydrogen to the reaction zone.

It is an object of the present invention to provide a method for suppressing the decomposition of the isomerizable hydrocarbons which is economical and practical and which obviates the difficulties which are inherent in the use of hydrogen.

Broadly, the invention comprises a process for isomerizing a saturated hydrocarbon by contacting said hydrocarbon with an isomerizing catalyst under isomerization conditions in the presence of a relatively minor amount of a nitroaromatic hydrocarbon or a monohaloaromatic hydrocarbon.

In one specific embodiment the present invention comprises a process for the production of isopentane by contacting normal pentane with an aluminum chloride-hydrogen chloride catalyst under isomerizing conditions in the presence of a relatively minor amount of nitrobenzene or monochlorobenzene.

I have discovered that the addition of these aromatic compounds selectively suppresses the decomposition reactions and permits the isomerization of the saturated hydrocarbons with a high degree of efficiency and low catalyst consumption. The exact mechanism by which these aromatic compounds suppress decomposition reactions is not thoroughly understood, but it will be evident from the experimental data hereinafter presented that greatly improved results are obtained when the aromatic compounds are present.

The aromatic compounds which may be employed to suppress decomposition reactions during the isomerization of saturated hydrocarbons comprise broadly the nitroaromatic hydrocarbons and the monohaloaromatic hydrocarbons, e. g., nitrobenzene, monochlorobenzene, nitrotoluene, monochlorotoluene, etc. These various compounds are not necessarily equivalent in their effectiveness since obviously different amounts of aromatic compound may be required dependent upon the nature of the catalyst and charging stock and also upon the operating conditions employed. These substituted aromatic hydrocarbons may be prepared by any of the conventional methods of organic synthesis involving alkylation and/or halogenation of aromatic nuclei. The concentration of the aromatic compound in the isomerization charging stock is generally from about 0.1% to about 10% by volume. The use of the above mentioned aromatic compounds to suppress decomposition reactions is particularly applicable to the isomerization of normal pentane since normal pentane exhibits an unusual tendency to undergo decomposition when subjected to isomerizing conditions. The various aromatic compounds are readily separated from the isomerization reaction products by fractionation or other suitable means and may be recycled to the isomerization step.

The operating conditions of the isomerization process such as temperature and pressure will vary somewhat depending upon the aromatic compound and catalyst employed. Ordinarily, temperatures within the range of about 50° F. to about 350° F. and more preferably within the range of from about 120° F. to about 250° F. and pressures varying from substantially atmospheric to about 500 pounds per square inch or more are desirable.

Any of the well-known Friedel-Crafts type isomerization catalysts may be employed. It is desirable that a hydrogen halide such as hydrogen chloride and hydrogen bromide be used in conjunction with these catalytic materials. The ordinary concentration of the hydrogen halide is within the range of about 1 to about 40 mol per cent of the charge and preferably from about 5 to about 20 mol per cent. The preferred catalysts comprise the chlorides and bromides of aluminum, zinc, zirconium, and iron, either alone or in admixture with one another. These catalysts may be employed in the solid granular state or upon inert supporting materials such as alumina, silica, thoria, crushed firebrick, quartz, activated clays, and activated chars.

It is also within the scope of this invention to employ mixtures of these compounds and in particular the aluminum halides with the halides of antimony, bismuth, and arsenic, to form catalyst composites which are molten under the conditions of operation.

The isomerization operation may be conducted in various ways. For example, the heated hydrocarbon charge containing the added aromatic compound may be passed either in the liquid, vapor, or mixed phase through a reaction zone containing a bed of solid granular catalyst either supported or unsupported, and the reaction product may be separated into the desired isomers and unconverted material the latter being recycled to the reaction zone.

Another method of operation consists of employing a catalyst supply chamber containing a bed of granular catalyst through which a stream of the charge is passed in liquid phase to dissolve the required amount of catalyst. This catalyst-containing stream is introduced into a reaction zone along with a regulated amount of the hydrogen halide, and a substantial portion of the hydrocarbon is isomerized therein. This reaction zone may comprise a large vessel which will provide sufficient time for the reaction to occur or may be filled with a retaining material such as molten salts, hydrocarbon-metal halide complexes, or solid packing materials such as bauxite, Raschig rings, berl saddles, granular quartz and other materials well known to those skilled in the art.

The following examples illustrate in a general way the effectiveness of the aromatic compounds disclosed herein in suppressing decomposition reactions during the isomerization operation. It is not intended that these examples unduly limit the generally broad scope of this invention.

A series of experiments was conducted to investigate the effect of nitrobenzene, monochlorobenzene, and para-chlorotoluene in the normal pentane isomerization reaction. An electrically heated autoclave equipped with a mechanical stirrer was charged with 85 grams of normal pentane and the designated amount of aromatic compound, and anhydrous aluminum chloride and hydrogen chloride were added. The autoclave was sealed and the reaction was carried out for a period of six hours. A blank run was also made without the addition of an aromatic compound to suppress decomposition reactions. The pertinent data from these tests are tabulated as follows:

| Run No. | 1 | 2 | 3 | 4 |
|---|---|---|---|---|
| Charge, grams: | | | | |
| Aluminum chloride | 15 | 15 | 15 | 15 |
| Hydrogen chloride | 2.8 | 2.7 | 2.7 | 2.9 |
| n-Pentane | 85 | 85 | 85 | 85 |
| Nitrobenzene | 0 | 2.0 | 0 | 0 |
| Monochlorobenzene | 0 | 0 | 2.2 | 0 |
| p-Chlorotoluene | 0 | 0 | 0 | 2.1 |
| Temperature, °C | 75 | 75 | 75 | 75 |
| Maximum pressure, p. s. i. gage | 110 | 92 | 75 | 70 |
| Time, hours | 6 | 6 | 6 | 6 |
| Analysis of product, mol %: | | | | |
| i-Butane | 54.1 | 6.8 | 3.3 | 25.3 |
| n-Butane | 8.1 | 8.4 | 0.6 | 0.9 |
| i-Pentane | 19.2 | 29.8 | 62.4 | 58.0 |
| n-Pentane | 11.8 | 43.1 | 32.1 | 9.0 |
| Hexane and higher | 6.8 | 11.9 | 1.6 | 6.8 |

In run 1, which was the blank run, it will be noted that although 19.2% isopentane was obtained there was also a total butane production of 62.2% which represents a relatively low efficiency of conversion of isopentane. In run 2 employing nitrobenzene, 29.8% isopentane was obtained with only 15.2% of butane thus indicating the marked effect of nitrobenzene in suppressing decomposition reactions. It will also be noted in run 2 that 43.1% of unconverted normal pentane was recovered. At somewhat more severe operating conditions higher conversions to isopentane would undoubtedly be obtained.

In runs 3 and 4, monochlorobenzene and para-chlorotoluene were employed, respectively. Comparing the results of these tests with the results obtained in run 1 it will be noted that the presence of the aromatic compounds suppressed the butane production to a marked extent and resulted in high yields of isopentane.

I claim as my invention:

1. An isomerization process which comprises contacting an isomerizable saturated hydrocarbon under isomerizing conditions with an isomerizing catalyst comprising a Friedel-Crafts type metal halide and a hydrogen halide in the presence of from about 0.1% to about 10% by volume based on said saturated hydrocarbon of a mono-substituted aromatic hydrocarbon in which the substituent group is selected from the class consisting of the chlor and nitro radicals.

2. An isomerization process which comprises contacting a normally liquid paraffin hydrocarbon with a Friedel-Crafts type isomerizing catalyst and a hydrogen halide under isomerizing conditions and in the presence of from about 0.1% to about 10% by volume based on said paraffin hydrocarbon of a mono-substituted aromatic hydrocarbon in which the substituent group is selected from the class consisting of the chlor and nitro radicals.

3. An isomerization process which comprises contacting a normally liquid paraffin hydrocarbon with a metal halide of the Friedel-Crafts type and a hydrogen halide under isomerizing conditions in the presence of from about 0.1% to about 10% by volume based on said paraffin hydrocarbon of a mono-substituted aromatic hydrocarbon in which the substituent group is selected from the class consisting of the chlor and nitro radicals.

4. An isomerization process which comprises contacting a normally liquid paraffin with an aluminum chloride catalyst and hydrogen chloride under isomerizing conditions and in the presence of from about 0.1% to about 10% by volume based on said paraffin hydrocarbon of a mono-substituted aromatic hydrocarbon in which the substituent group is selected from the class consisting of the chlor and nitro radicals.

5. An isomerization process which comprises contacting normal pentane with an isomerizing catalyst comprising a Friedel-Crafts type metal halide and a hydrogen halide under isomerizing conditions in the presence of from about 0.1% to about 10% by volume based on said pentane of a mono-substituted aromatic hydrocarbon in which the substituent group is selected from the class consisting of the chlor and nitro radicals.

6. An isomerization process which comprises contacting normal pentane with an aluminum chloride catalyst and hydrogen chloride under isomerizing conditions in the presence of from about 0.1% to about 10% by volume based on said pentane of a mono-substituted aromatic hydrocarbon in which the substituent group is selected from the class consisting of the chlor and nitro radicals.

7. The process of claim 1 wherein said substituted aromatic hydrocarbon comprises mononitrobenzene.

8. The process of claim 1 wherein said substituted aromatic hydrocarbon comprises monochlorobenzene.

9. The process of claim 1 wherein said substituted aromatic hydrocarbon comprises monochlorotoluene.

10. The process of claim 6 wherein said substituted aromatic hydrocarbon comprises mononitrobenzene.

11. The process of claim 6 wherein said substituted aromatic hydrocarbon comprises monochlorobenzene.

12. The process of claim 6 wherein said substituted aromatic hydrocarbon comprises monochlorotoluene.

13. In the isomerization of saturated hydrocarbons in the presence of metallic halide catalysts of the Friedel-Crafts type, the improvement which comprises adding to the hydrocarbons to be isomerized from about 0.1% to about 10% by volume based on said saturated hydrocarbons of a mononitroaromatic compound.

14. In the isomerization of saturated hydrocarbons in the presence of metallic halide catalysts of the Friedel-Crafts type, the improvement which comprises adding to the hydrocarbons to be isomerized from about 0.1% to about 10% by volume based on said saturated hydrocarbons of a mono-substituted aromatic hydrocarbon in which the substituent group consists of the chlor radical.

15. An isomerization process which comprises subjecting an isomerizable normally liquid saturated hydrocarbon to the action of a Friedel-Crafts metal halide catalyst and a hydrogen halide promoter under isomerizing conditions in the presence of a suppressor of decomposition reactions in an amount of from about 0.1% to about 10% by volume based on said saturated hydrocarbon and comprising a mono-substituted aromatic hydrocarbon in which the substituent group is selected from the class consisting of the chlor and nitro radicals.

16. The improvement as defined in claim 13 further characterized in that said substituted aromatic hydrocarbon is nitrobenzene.

BERNARD S. FRIEDMAN.

REFERENCES CITED

The following references are of record in the file of this patent:

UNITED STATES PATENTS

| Number | Name | Date |
| --- | --- | --- |
| 2,250,118 | Smithuysen | July 22, 1941 |
| 2,355,198 | Atwell | Aug. 8, 1944 |
| 2,404,436 | Crawford et al. | July 23, 1946 |

FOREIGN PATENTS

| Number | Country | Date |
| --- | --- | --- |
| 526,215 | Great Britain | Sept. 12, 1940 |
| 549,003 | Great Britain | Nov. 3, 1942 |